US011822373B1

(12) United States Patent
Tang et al.

(10) Patent No.: US 11,822,373 B1
(45) Date of Patent: Nov. 21, 2023

(54) SECURE AI-BASED SHARING AND TRANSMISSION OF DATA

(71) Applicant: HIFIDATA LLC, North Potomac, MD (US)

(72) Inventors: Zilong Tang, North Potomac, MD (US); Albert Tang, Philadelphia, PA (US)

(73) Assignee: HiFiData LLC, North Potomac, MD (US)

( * ) Notice: Subject to any disclaimer, the term of this patent is extended or adjusted under 35 U.S.C. 154(b) by 0 days.

(21) Appl. No.: 18/331,695

(22) Filed: Jun. 8, 2023

(51) Int. Cl.
*G06F 16/35* (2019.01)
*G06F 21/62* (2013.01)

(52) U.S. Cl.
CPC ........ *G06F 16/355* (2019.01); *G06F 21/6209* (2013.01)

(58) Field of Classification Search
CPC .......................... G06F 16/355; G06F 21/6209
See application file for complete search history.

(56) References Cited

U.S. PATENT DOCUMENTS

| | | | | |
|---|---|---|---|---|
| 2019/0386814 | A1* | 12/2019 | Ahmed | H04L 9/008 |
| 2021/0279341 | A1* | 9/2021 | Huck | H04L 9/0656 |
| 2023/0050675 | A1* | 2/2023 | Nakamura | H04L 9/0618 |

OTHER PUBLICATIONS

Brightwell, Michael, and Harry Smith. "Using datatype-preserving encryption to enhance data warehouse security." 20th National Information Systems Security Conference Proceedings (NISSC). 1997. (Year: 1997).*
Archana, R. A., and Ravindra S. Hegadi. "Applications of Data Masking Techniques for Data Security." (2014). (Year: 2014).*
Maeda, Wakana, Yu Suzuki, and Satoshi Nakamura. "Fast text anonymization using k-anonyminity." Proceedings of the 18th International Conference on Information Integration and Web-based Applications and Services. 2016. (Year: 2016).*
Agbeyibor, Richard, et al. "Evaluation of format-preserving encryption algorithms for critical infrastructure protection." Critical Infrastructure Protection VIII: 8th IFIP WG 11.10 International Conference, ICCIP 2014, Arlington, VA, USA, Mar. 17-19, 2014, (Year: 2014).*
Sultana, Sayyada Fahmeeda, and D. C. Shubhangi. "Privacy Preservation of Scalable Data On Cloud Using Mapreduce Based Anonymization and Bilingual Substitution Cipher." (Year: 2018).*
Balogun, Abdullateef Oluwagbemiga, et al. "Multiple Ceaser Cipher Encryption Algorithm." (2017). (Year: 2017).*

* cited by examiner

*Primary Examiner* — Mohsen Almani
(74) *Attorney, Agent, or Firm* — Brake Hughes Bellermann LLP

(57) ABSTRACT

Implementations provide a secure and flexible encoding technique that enables data set owners to share data without losing interoperability or breaking data constraints. A device may receive a request to encode an input that includes a plurality of data portions. A device may identify protected data types within the data portions, transform raw text corresponding to a protected data type based on a seed and a base set to encoded text, and include the encoded text in an output. The seed and/or base set can be selected by a requestor. The output configuration can be defined as different from the configuration of the input. The encoded text retains a format of the raw text so the encoded text does not violate existing data constraints. The device may also ensure a minimum level of fidelity in the encoded text.

21 Claims, 4 Drawing Sheets

| Protected Data Type 305 | Raw text 314 | Transformed text 331 |
|---|---|---|
| Name.first | DEWEY | Qrjl |
| Name.last | ETTER | Rggre |
| Address.number | 1220 | 5882 |
| Address.street | BELLVIEW DR | Oryyfivrj DR |
| Address.city | GREENDALE | Terraqnyr |
| Address.zip | 47025 | 70358 |
| DOB | 1962-07-28 | 1934-11-24 |
| Phone | 5135552645 | 6958667016 |
| SSN | 530-66-2425 | 651-77-0206 |

| Unprotected Data Type 310 | Raw text 314 | Untransformed text 332 |
|---|---|---|
| Address.state | IN | IN |

FIG. 3

SECURE AI-BASED SHARING AND TRANSMISSION OF DATA

TECHNICAL FIELD

The disclosure relates to methods, systems and programming for the secure sharing, transmission, and analysis of data. Particularly, the present teaching is directed to methods for algorithmically encoding some/all data elements in an input (e.g., data set) in a manner that supports cross domain interoperability, preserving the ability to use the data elements in analysis without decoding, while protecting/securing the original (raw/unencoded) values.

BACKGROUND

Many organizations, such as banks, healthcare entities, universities, insurance companies, advertisers, research organizations, business departments or any other data set owner, etc., deal with sensitive data. Sensitive data can be data personally-identifying data or just personal data. Sensitive data can be account information. Sensitive data can be trade secret information (e.g., customer lists or other curated data). Sensitive data can be any data element defined by the data set owner as sensitive. Sensitive data can be data that is subject to restrictions on transportation, storage, and/or who has access to the data. Sensitive data can be subject to regulations, such as healthcare data subject to HIPAA and other regulations in the United States, financial data subject to FDIC and other regulations, and personally identifying data subject privacy regulations in the European Union. Not all sensitive data is subject to government regulations or organizational policies. Sensitive data can be any data for which the data set owner seeks to hide/protect during distribution or sharing.

SUMMARY

Implementations provide techniques for enabling secure sharing of sensitive data.

Implementations offer flexible, customizable, and secure transformation (encoding) of data representing a protected data type. The transformation may be referred to as encoding the data set (e.g., the input). The transformation (encoding) enables use of the underlying data elements in analysis (e.g., clustering, classifying, joining with other data sets, etc.) without decoding any encoded data elements. Implementations can support different configurations by the data set owner that may make decoding of the data elements difficult or even near impossible. For example, the data set owner can set a seed parameter used to transform the fields. The data set owner can set a base set used to transform the fields. The data set owner can set the seed and the base set used to encode the fields. If the data set owner does not provide a seed parameter a default may be used. If the data set owner does not provide a base set, implementations may select a default base set. The base set can be selected based on the type of data to be encoded. The seed may be selected based on the type of data to be encoded. In some implementations, two different fields (e.g., name and zip code) within the dataset may be encoded with a different seed, a different base set, or both.

Implementations can operate on structured data sets or non-structured data sets. As used herein, a data set is also referred to as an input or input file. A data set, input, or input file can be any file type. Implementations can decompose and classify text strings (words, phrases, etc.) found in non-structured data sets to identify text strings that represent a protected data type. In some implementations, protected data types may be identified by field type in structured data. In some implementations, a decomposer and/or classifier may be applied to the content of a data set to identify protected data types. The decomposer and/or classifier can be applied to non-structured data, e.g., to identify text strings as data elements and to classify the data elements as a particular data type. The decomposer and/or classifier can be applied to structured data to identify and classify strings within a field as a particular data type. In some implementations, the system may assign a default transformation method, base set, and/or seed parameter to a protected data type. Implementations may also include a customization related to fidelity. Fidelity represents how similar or different the transformed data looks from the original data.

Implementations can encode sensitive data elements (strings, fields) in a data set in a manner that preserves the expected format of the data element as well as preserves the distribution and statistical characteristics of data elements in the data set, especially the protected data types. This enables the encoded data set to be used as input to existing processes. For example, an existing process may cluster data by zip code and determine the number of unique people within the cluster. The process may use street address and/or first name & last name to count uniqueness. These data elements are generally considered sensitive information and may not be shared for analysis without de-identification. But de-identification using conventional methods can degrade the accuracy of the data; for example, a street address may be generalized to a zip code, a county, or a state and/or names may be removed altogether. This results in loss of data granularity. De-identification using conventional methods may change the format of the data element so the existing process cannot use it; for example, base64 encoding usually increases the length of a string, for example converting a first name that is expected by the existing process to be 30 alphanumeric characters into a field with >30 alphanumeric characters, which breaks database constraints and validation logic of existing process pipelines. Other conventional techniques such as masking are lossy. For example, masking a phone number or a social security number to keep only the last four digits is lossy because the masked number no longer represents a unique identifier and, therefore, cannot be used as such (e.g., to join records). Another problem with conventional methods is that the change in format breaks validation logic of an existing process pipeline. Disclosed implementations provide a lossless encoding that solves all these issues, ensuring accuracy and maintaining original formatting in the encoded data set, so the encoded data set is usable without decoding.

Implementations address a technical problem that arises in the realm of data analytics. Data analytics serves as the foundation of machine-learning models, including self-tuned networks, which address problems in many different areas, including fraud detection, clinical trial analysis, recommendation systems, etc. Third parties (a party that is not an owner of a data set) often want to use data sets for analysis, but sensitive information in the raw (original) data set can prevent a data owner from granting access to use the data, even when the sensitive information is not revealed in the output/result of the analysis. Data set owners may not be willing to share data sets that include sensitive data because of the risk of sensitive data loss, leaks, or because of policies and/or regulations. Thus, a technical problem is how to protect sensitive data without losing the granularity (accuracy) and format of the data, which makes the analysis possible. Implementations provide systems that can provide an algorithmic, customizable, and flexible process to address this problem, resulting in a highly customizable encoding of the data elements in a way that maintains data granularity, preserves the ability to use the data elements in joining data sets, can preserve readability, etc. Disclosed implementations make the data usable in data analytics while the sensitive data elements are encoded, which protects sensitive data elements from leaning to third parties. Disclosed implementations may also provide analysis of the input to assist a requester in customizations, such as identifying protected data types, identifying appropriate base sets, etc.

BRIEF DESCRIPTION OF THE DRAWINGS

The methods, systems and/or programming described herein are further described in terms of example implementations. These example implementations are described in detail with reference to the drawings. These implementations are non-limiting example implementations, in which like reference numerals represent similar structures throughout the several views of the drawings, and wherein:

FIG. 3 shows example protected data types and example transformed data, according to a disclosed implementation.

DETAILED DESCRIPTION

Figure 1:
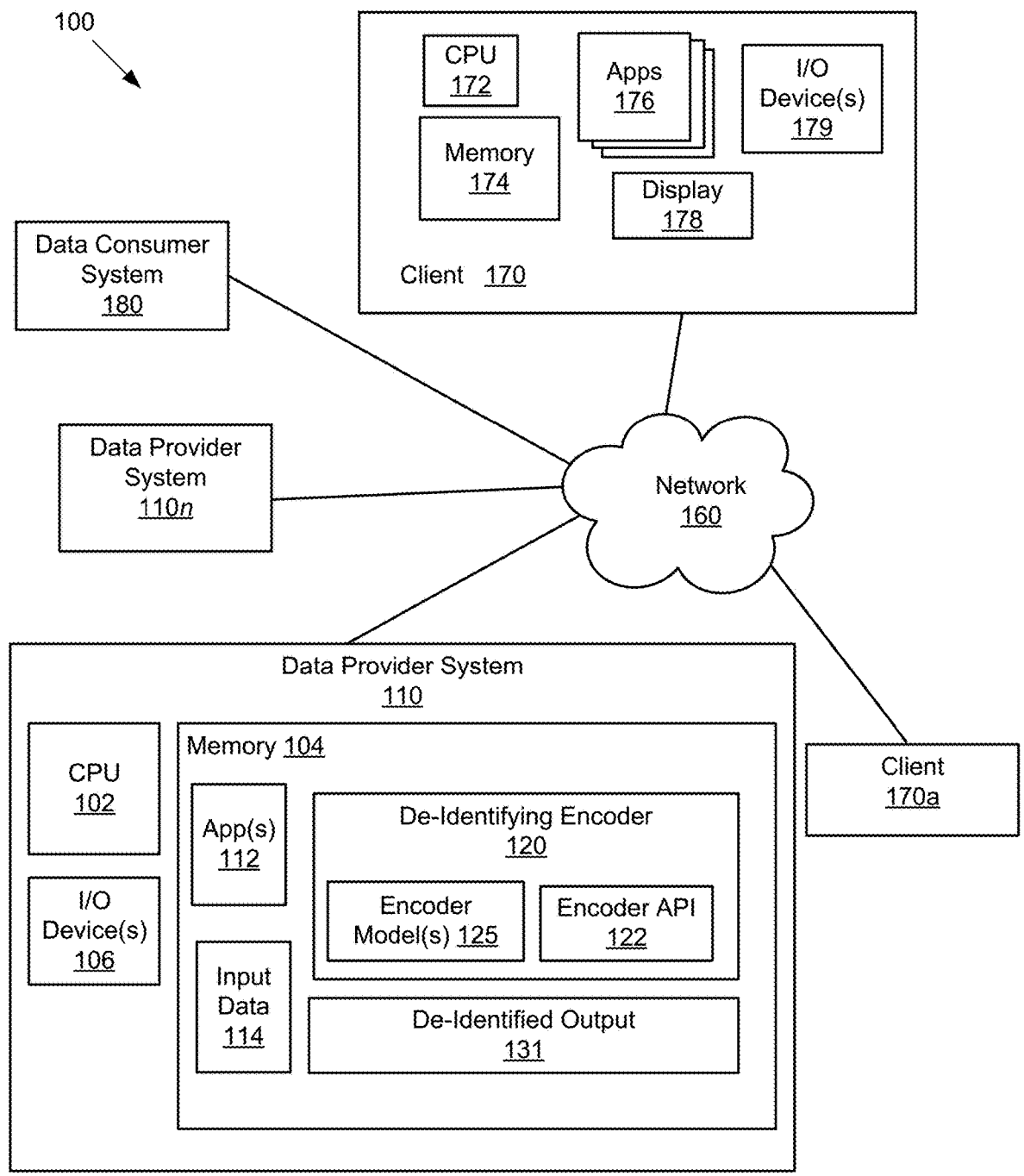
FIG. 1 describes a high level depiction of a system configuration, according to a disclosed implementation.

In the following detailed description, numerous specific details are set forth by way of examples to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Some example implementations are described with regard to health related entities as sources of health related data, however, the embodiments are not limited to the healthcare industry and the inventive concepts can be applied to any setting in which a data set owner may seek to encode data elements before providing access to the data set to a third party. For example, the disclosed techniques may be used in financial industries, educational institutions, criminal justice systems, corporations, social media sites, etc., that deal with sensitive or regulated personal and/or financial information.

To solve the problems associated with protecting sensitive data while making such data available for data analytics tasks or data sharing generally, implementations provide a system that may identify protected data types in an input and transform (i.e., encode) data elements (strings/fields, etc.) represented by the protected data types. The transformations are done in a manner that supports cross-domain interoperability. Put another way, the transformation protects the meaning of the coded data from a human but retains the ability to be used in analysis. The transformation is based on a seed and a base set. The seed can be provided by a requester, e.g., via an API, or can be a default. The seed can be applicable to one particular protected data type, applicable to protected data types having a particular format, or applicable to all particular protected data types in the input. Implementations can operate with almost anything selected by the dataset owner as the seed. The base set may be provided by a requester, can be selected based on analysis of the input, can be selected based on the protected data type, or can be a default base set.

The transformation can be based on a fidelity parameter. The fidelity parameter is an indication of the randomness of the transformation. A transformation with high fidelity results in an encoded value with high randomness. In such a transformation, the encoded value may include letters, symbols, or numbers where the original value is only letters. High fidelity may also result in the number of characters in the encoded value being different than the number of characters in the original value. A transformation with low fidelity results in an encoded value with high randomness as compared to the original (raw) data. In other words, low fidelity encoding has low similarity with (larger distance from) the original data. A transformation with high fidelity has low randomness as compared to the original data. For example, a transformation with high fidelity may tolerate characters being the same as the raw data (e.g., an A may stay an A when encoded), where a transformation with low fidelity may not tolerate any (or very few) character remaining the same in the encoded output. The fidelity parameter may be a value that represents a percentage. The system can use this percentage to ensure the encoded output is at least as random as requested (e.g., by the percentage). For example, a randomness percentage of 10% (very high fidelity) may indicate that 90% of the characters can be the same as the raw data, while a randomness percentage of 100% indicates that no character from the raw data can be the same in the output. Even with low fidelity, implementations can preserve the format of the data. The format may include the character type, e.g., a letter is encoded as a letter if the original text is alphabetic (letters only), a number is encoded as a number if the original text is numeric, a letter is encoded as a number or a letter if the original text is alphanumeric, etc. In some implementations with low fidelity, a number may be encoded with a different base, e.g., so that a decimal digit (0-9) can be replaced with a hexadecimal digit (e.g., 0-F). Preserving the format of the input can also mean that the number of characters in an encoded text string matches the number of characters in the original text string.

Implementations may work on any input, whether the input represents structured input or unstructured input. Structured input includes metadata that marks data portions, i.e., fields, within the input. Non-limiting examples of structured inputs include spreadsheets, delimited files, databases, tables, XML files, JSON files, etc. Structured data can be any data that includes attribute-value pairs. Non-structured input is any other input. Non-limiting examples of non-structured input include documents, webpages, text files, presentation slides, etc. One input (file) can include both structured and unstructured data. For example, a web page may include a table, the table being structured data and the paragraphs in the web page being unstructured data.

Some implementations can provide the output (which includes the de-identified content) in a same configuration as the input. Some implementations can not only encode content that is a protected data type, but may also convert the input to a configuration requested by the user. In other words, the configuration and/or makeup of the output can be customizable. Put another way, not only are protected data types encoded in the output, but some implementations can convert an input that is a PDF document to a comma-delimited file or XML that is the output. Fields in the comma-delimited or XML file are extracted from the document and none, one, some, or all of the fields in the output may be encoded. Thus, for example, the system may take as input loan agreements and provide, as output, specified fields extracted from the agreements, with protected fields being de-identified (i.e., encoded). As another example, the requestor can specify a storage period for the output, e.g., specifying whether the encoded output is kept in long term or short term storage.

As shown in FIG. 1, a networked environment 100 may include a number of computing devices that are in data communication with each other through a network 160 or a series of networks 160. The networks 160 may include the Internet, a local area network (LAN), a wide area network (WAN), a mobile network, an intranet, etc., or some combination of these. In some implementations, the network 160 represents more than one network, e.g., the Internet and a WAN or the Internet and a mobile network.

The computing devices in environment 100 may include servers, such as data provider system 110, data provider system 110, and data consumer system 180. The computing devices may also include client devices, such as client 170, which provide a user interface, for example via a browser or through a mobile application, for a human user to access various applications available over a network 160, such as the Internet or an intranet.

The data provider system 110 may be a web-based enterprise system for an organization, such as a financial organization, an educational institution, a social media provider, a news provider, other website provider, or a healthcare organization, such as, for example, a hospital, a clinic, or an electronic medical records system (EMR) for a healthcare provider's office. The data provider system 110 may require its users (e.g., employees or customers) to login with login credentials (typically a username and a password or token) before accessing the records (e.g., input data 114) and applications (e.g., apps 112, de-identifying encoder 120) of the data provider system 110. The data provider system 110 may include a computing device, such as a computer, a server or a number of communicatively connected distributed servers, a mainframe, etc., that has one or more processors 102 (e.g., a processor formed in a substrate) configured to execute instructions stored in memory 104, such as main memory, RAM, or disk. The instructions may be stored in modules or engines and may provide functionality typical of an enterprise system, including an EMR.

The data provider system 110 may include one or more applications 112 that provide access to data and/or generate data, such as input data 114. In some implementations (not shown), the input data 114 may be distributed from, but accessible to, the data provider system 110. In such an implementation, the data provider system 110 may still be considered the provider of the input data 114. The data provider system 110 may be configured to handle high traffic, e.g., twenty to thirty thousand requests an hour. Accordingly, the data provider system 110 may include a number of different computing devices coordinated by a cluster controller or similar configuration. In some implementations, the data provider system 110 may be secured behind a firewall (not illustrated), which may prevent unrecognized systems from sending requests to the data provider system 110. Implementations of a data provider system 110 may include fewer or more modules than those illustrated in FIG. 1.

The data provider system 110 includes a de-identifying encoder 120. The de-identifying encoder 120 is a module or program that encodes input data 114 to de-identify protected data types identified within the input data 114 and generates de-identified output 131. The de-identified output 131 may be provided to the data requester (e.g., client 170 or data consumer system 180). In some implementations, the de-identified output 131 is provided over the network 160.

De-identifying encoder 120 can be configurable. For example, de-identifying encoder 120 can include encoder API 122. The encoder API 122 enables a data requester, e.g., data consumer system 180 and/or client 170, to provide parameters that control/influence the transformation (encoding) of the input data 114. In some implementations, the encoder API 122 enables a data requester, e.g., data consumer system 180 and/or client 170, to specify an output configuration that differs from the configuration of the input data 114. In some implementations, the user of the client 170 may use the encoder API 122 to identify a data consumer system 180 that will receive the de-identified output 131. In some implementations, the user of client 170 may use the encoder API 122 to specify a storage period for the de-identified output 131. The customizations supported by various implementations of the encoder API 122 are discussed in more detail with respect to FIGS. 2A and 2B.

The de-identifying encoder 120 may include encoder model(s) 125. The encoder model(s) 125 may include a single model. The encoder model(s) 125 may include two or more different models. The de-identifying encoder 120 may use the model(s) 125 to identify protected data types in the input. The de-identifying encoder 120 may use the model(s) 125 to select a base set. The de-identifying encoder 120 may use the model(s) 125 to determine whether the transformed content meets a requested level of fidelity. The de-identifying encoder 120 may use the model(s) 125 to select a transformation applied to content that is identified as a protected data type. The de-identifying encoder 120 may use the model(s) 125 to identify content from the input to include in the output. The encoder model(s) 125 is also discussed in more detail with regard to FIGS. 2A and 2B.

In some implementations, the client 170 may access API 122, which enables the client 170 to communicate with data provider system 110. In some implementations, the API 122 may only be accessible if client 170 has completed successful authentication with the data provider system 110. In some implementations the client 170 is a terminal within the data provider system 110. In some implementations, the data provider system 110 and the client 170 may be part of a client-server system, e.g., a web-based healthcare system. The client 170 may communicate with the data provider system 110 (or the data consumer system 180) via network 160. In some implementations, the client 170 is a terminal within a local network for the data provider system 110 and does not have direct access to the Internet or other computing systems. In other words, the client 170 may be behind a firewall inside data provider system 110 and data provider system 110 may block or enable communications of client 170 with other computing systems. A requester may use the client 170 to request a de-identified (encoded) version of input data 114, as explained herein. In some implementations, the client 170 is a terminal within a data consumer system 180. In some implementations, the data consumer system 180 and the client 170 may be part of a client-server system, with the client 170 communicating with the data consumer system 180 and/or the data provider system 110 via network 160. In some implementations, client 170 may be a data consumer system 180.

The client 170 may be a personal computing system, a terminal, a laptop, a tablet, a wearable computing device (e.g., a smart watch or smart glasses), or another mobile device such as a smartphone, an iPad or an iPad mini. Client 170 may include one or more processors 172 (e.g., a processor formed in a substrate) configured to execute instructions stored in memory 174, such as main memory, RAM, flash, cache, or disk. Client 170 may also include input devices 179, such as a microphone, a keyboard (virtual or physical), a touch screen, a mouse, a camera, a voice recorder, etc. Client 170 also includes a display 178 or other output device. The client may also include one or more applications 176 that perform various functions, e.g., a browser, a word processing program, a spreadsheet program, an email client, a mobile application etc.

The environment 100 may include multiple clients 170 (e.g., client 170a), each configured to access the encoder API 122 to initiate generation and sharing of de-identified output 131. The environment 100 may also include multiple data provider systems 110, e.g., data provider system 110n. In some implementations, the data provider system 110 and the data provider system 110n may be in communication with each other, e.g., over network 160. The environment 100 may include multiple data consumer systems 180. Thus, for example, a particular data consumer system 180 may request different input data 114 from different data provider system 110. The particular data consumer system 180 may analyze the received de-identified outputs 131 (e.g., a de-identified output 131 from data provider system 110 and a de-identified output 131 from data provider system 110n). In a scenario where the data provider system 110 and the data provider system 110n communicate with each other and agree on parameters provided to the de-identifying encoder 120, the particular data consumer system 180 may be able to join records in the two de-identified outputs 131 without having to decode the de-identified fields because the two data provider systems encode the data in the same way. Similarly, client 170 and client 170a may each request the same input data 114 from data provider system 110, but client 170 may receive a different de-identified output 131 than client 170a because of different parameters (seed, base set, fidelity, etc.) used in encoding the input data 114.

Figure 2A:
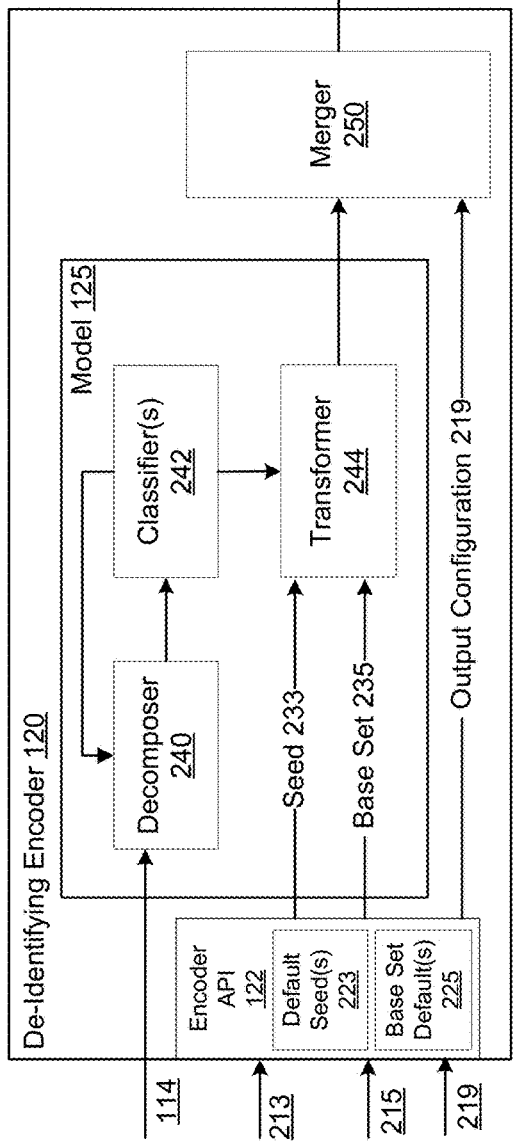
FIG. 2A describes a high level depiction of an example de-identifying encoder, according to a disclosed implementation.

FIG. 2A describes a high level depiction of an example de-identifying encoder, according to a disclosed implementation. The de-identifying encoder of FIG. 2A is an example of de-identifying encoder 120 of FIG. 1. The de-identifying encoder 120 operates on (takes as input) input data 114. The input data 114 can be any file identified by a requester. The requester is a user, application, or other process that uses an application program interface to provide the input data 114 and request de-identification of the input data 114. The application program interface can include encoder API 122. The input data 114 can be remote from, but accessible to the computing device on which the de-identifying encoder 120 executes. When the requester identifies the input data 114, the requester may include filter criteria for the input data 114. In other words, in some implementations, the requester may specify criteria that a data portion of the input data 114 must meet to be transformed and included in the de-identified output 131. In some implementations, the encoder API 122 may be configured to receive the identification of the input data 114 and any criteria for filtering out data portions from the input data 114.

The data requester can also provide other parameters, e.g., via encoder API 122. One parameter may be a seed parameter 213. The seed parameter 213 is used to define a starting point in a base set for the encoding/transformation process. Thus, the same content processed with two different seeds can result in different encoded values for the content, even if the same base set is used. A seed can be a password. As seed can be a passphrase. A seed can be biometric (e.g., fingerprint scan, face scan, voice print, retinal scan, etc.). A seed can be an audio file. The seed can be a number. Providing the seed parameter 213 is optional. If the requester does not provide a seed parameter 213, the system (e.g., the de-identifying encoder 120) may use a default seed 223. The de-identifying encoder 120 may have access to one or more default seeds 223.

In some implementations, the de-identifying encoder 120 may utilize more than one seed. For example, a different seed may be used for each protected data type. In another example, a default seed (e.g., a first seed) may be used for most protected data types and another seed (e.g., a second seed) may be used for a particular protected data type. In another example, a first seed may be used for alphabetic data types, a second seed for alphanumeric data types and a third seed may be used for numeric data types. In implementations that use multiple seeds (dependent on data type), the requester may provide one or more of the seeds. Any data-type dependent seeds not provided by the requester may be selected from the default seeds 223. Thus in implementations that use multiple seeds, the de-identifying encoder 120 may include multiple different default seeds. In some implementations, the encoder API 122 may offer different seeds to the requester and the requester may select one of the offered seeds as the seed parameter 213. In some implementations, the encoder API 122 may offer different default seeds for different data types. As one example, the system may include one or more first default seeds (e.g., in default seeds 223) for the alphabetic data types, one or more second default seeds for the alphanumeric data types, one or more third default seeds for the numeric data types, etc. In some implementations, the system (e.g., the encoder API 122) may enable the user to select from the different defaults. For example, the seed parameter 213 (e.g., first seed, second seed, and/or third seed, etc.) may be selected by the requester from default seeds 223. In some implementations, the API 122 may offer default seed types for the requester to provide. For example, the encoder API 122 may offer to take a voice sample, a background recording sample, an image, a video, etc., as the seed parameter 213. To simplify the discussion of FIG. 2A, only one seed parameter 213 and one seed 233 is illustrated, but it is understood that these may represent multiple seeds, e.g., dependent on data format/data type.

In some implementations, the seed parameter 213 provided by the requester (or the default seed 223) may be converted to seed 233. Seed 233 represents a seed usable by the transformer 244. Generally, the transformer 244 operates with a numeric seed. Accordingly, if the seed parameter 213 (or the default seed 223) is not already numeric, the seed parameter 213 is converted to a number. This can be done using known or later discovered techniques (e.g., using a length of the seed parameter 213, hashing the seed parameter 213, masking the seed parameter 213 to generate a number, using the first x bits of an audio file or biometric to generate a number, etc.). The seed parameter 213 can be anything the owner of the data set (e.g., the requester) chooses. In some implementations, the seed parameter 213 or a portion of the seed parameter 213 can be used to determine multiple seeds 233. In other words, some portion of seed parameter 213 can be used to generate a first seed 233, a different portion of seed parameter 213 can be used to generate a second seed 233, etc. The different seeds 233 can be used for different data types as described above. As another example, some seeds 233 can be used to determine the number of partitions the base set is divided into. In some implementations, the transformer 244 may be configured to convert the seed parameter 213 to seed 233 (or seeds 233). As indicated above, each seed to be used (whether a seed parameter 213 or default seed 223) has a corresponding seed 233 (or seeds 233). In some implementations, the default seeds 223 do not require conversion and already represent the seed 233. Each seed 233 defines a relationship with a base set. The relationship may be a starting position in the base set. In some implementations, one seed 233 can be used for multiple different base sets. In some implementations, multiple seeds 233 can be used for a same base set. In some implementations, seeds and base sets may be dependent on the protected data type being encoded or the format of the protected data type being encoded. In some implementations, the transformer 244 determines which seed 233 and which base set 235 to use in encoding a protected data type. The relationship may also be a partition for the base set, e.g., a number of partitions, a length of each partition, etc.

Another parameter may be a base set 215 parameter. A base set is used by the transformer to encode the content corresponding to a protected data type. The choice of base set affects how unique the encoded values are. Put another way, the choice of base set affects whether the resulting encoded values include clashes. A clash occurs when two different raw strings end up with the same encoded value. Clashes can be undesirable, especially when the de-identified data is used in analysis because it decreases the data accuracy. Data accuracy is decreased because two different raw strings could be considered in the analysis to be the same string if the encoded values clash. Because the choice of base set affects the quality of the encoded data portions, the system may include a base set default(s) 225. The base set default(s) 225 represent a base set (or base sets) that have been curated for the de-identifying encoder 120. In some implementations, the base set defaults(s) 225 represents one base set. In some implementations, the default(s) 225 represents two or more base sets. In some implementations, a default base set may be identified as appropriate for a particular protected data type or a particular format of a particular data type. For example, the number pi ($\pi$) may be one of the default base sets and the number e (Euler's number) may be another default base set. These base sets may be identified as particularly helpful for translating numbers to numbers.

In some implementations, the user may provide the base set 215 by selecting one of the default(s) 225. As with the seeds, the suggested base sets (i.e., the base sets from the default(s) 225 provided as selectable options to the requester) may be based on the protected data type or the format of a protected data type. Thus, for example, some base sets in the default(s) 225 may be more appropriate for a first protected data type or format (e.g., alphanumeric) and other base sets in the default(s) 225 may be more appropriate for a second protected data type or format (e.g., numeric). Thus, as with the seed parameter 213, the base set 215 can represent multiple base sets. Whether provided by the user (e.g., as base set 215) or selected by the system from default(s) 225, a base set 235 is provided to the transformer 244.

Another parameter may be the output configuration 219. If an output configuration 219 is not provided, the de-identified output 131 has the same configuration as the input data 114. The output configuration 219 includes instructions for formatting the de-identified output 131. These instructions can include a storage period for the de-identified output 131. These instructions can include identification of a structured configuration (e.g., comma delimited file, spreadsheet file, fixed-width file, JSON file, XML file, etc.). These instructions can include identification of data types to be included in the de-identified output 131. In some implementations, the system may include a process for analyzing the input data 114 and providing any identified data types, including protected data types, for selection by the requester. Such a user interface for selecting identified data types to include in the de-identified output 131 can be provided by the encoder API 122.

In some implementations (not illustrated), the encoder API 122 may provide an opportunity for the user to select data types to de-identify in the de-identified output 131. For example, the system may include a process configured to analyze the input data 114 to identify data types contained in the input data 114. In some implementations, these processes can be performed by a decomposer 240 and/or a classifier 242. The system may identify some data types as protected data types by default. For example, street addresses, phone numbers, names, identifiers (driver's licenses, social security numbers, etc.), account numbers, etc. may be protected by default. Other data types, e.g., state codes, business names, course identifiers, account descriptions, medication identifiers, dates that are not birthdates, etc., may not be identified as protected by default. In some implementations, the encoder API 122 may enable a requester to change one or more of the unprotected data types identified in the input data 114 into a protected data type. For example, the user may choose to make the state codes or course identifiers a protected data type. In some implementations, the requester cannot change default protected data types into unprotected data types. In some implementations, the requester can change some default protected data types into unprotected data types.

The de-identifying encoder 120 can include a decomposer 240 and a classifier 242. The decomposer 240 and the classifier 242 are configured to work together to identify protected data types in the input data 114. In some implementations, the decomposer 240 and/or classifier 242 may be run an initial time to identify the data types in the input data 114 to be encoded. This initial time may enable the encoder API 122 to provide the requester with an opportunity to specify an output configuration 219, select an appropriate base set, and/or to change the protected data types. The decomposer 240 may perform a coarse analysis of the input data 114 to identify top-level classes (i.e., categories) and the classifier 242 may break the top-level class into more specific classifications. In some implementations, the classifier 242 may include multiple different classifiers, each trained to classify text for a particular top-level category using known techniques.

The decomposer 240 can include a pattern matcher. The pattern matcher looks for patterns known to represent certain data types. For example, the pattern (xxx)xxx-xxxx is known to identify a phone number (where x represents any digit). The decomposer 240 can be configured to look for any known pattern for a data type, e.g., using a regular expression. The pattern may include a pattern of character types (e.g., a letter-number-letter number-letter-number pattern of a postal code in Canada). The decomposer 240 can be configured to take in structured data and use a heading row or attributes to identify data types to be protected. The decomposer 240 can include a frequency calculator. The frequency calculator may be used in an initial analysis of the input data 114. The frequency calculator may be used over a data portion. The frequency calculator may be configured to identify patterns of text that repeat with an unexpected frequency, e.g., the frequency exceeds an expected frequency threshold. Text that occurs with an unexpected frequency (in the data portion or in the input data 114 generally) may represent text that is a name. Put another way, names typically have a low expected frequency, but when a document is about a person, that person's name appears frequently within the document. Therefore, unexpected frequency can be a signal that the text might represent a data type to be protected. In some implementations, text that appears with a frequency that exceeds the frequency threshold is automatically considered a protected data type and is encoded. In some implementations, a user may be provided an opportunity to identify the text pattern as a protected data type.

The decomposer 240 may include one or more machine-learned models. The machine-learned models can include a model (or models) trained to perform natural language processing using known or later-developed techniques. A natural language processing (NLP) model is trained to identify parts of speech within text. This is helpful for identifying protected data types, which appear as nouns in unstructured text. For example, the nouns represent entities, or categories of entities, depending on the model. For example, a natural language processing model used by decomposer 240 can identify text (a single word, a phrase, etc.) that likely represents an animal, a person's name, a medication name, an account number, a phone number, an address, etc. Each of these entities can be considered a data type. In some implementations, guided training may be used to speed up training of the model (or models). For example, because protected data types represent a small subset of all data types, so a few examples can be used to speed training and recognition of protected data types. While some of these data types can be identified with pattern matching that does not use a machine-learned model, the NLP model uses context to predict that the text is likely to be a particular data type (e.g., that a string of 10 numbers is a social security number and not a phone number or vice versa). So, the NLP model can identify phone numbers that do not match a pattern. The NLP model can also identify text likely to be a person's name, text likely to be a birthdate rather than some other date, etc. The machine-learned model(s) of the decomposer 240 can include one or more semantic context based models. A semantic context based model may be a model trained and/or fine-tuned for a specific environment or horizontal, such as a model trained/fine-tuned for a real-estate horizontal, a model trained/fine-tuned for a medical horizontal, a model trained/fine-tuned for a financial horizontal, etc. Such models can more accurately identify entities or classes of entities likely to be represented in the horizontal. The decomposer 240 can include machine-learned models that analyze text from a structured input to determine which data portions in a record represent protected data types. In some implementations, an NLP may run against a header or attributes in a structured input file. In some implementations, the encoder API 122 may enable the requester to identify data types identified by the decomposer 240 and/or the classifier 242 in the input as protected data types.

In some implementations, the decomposer 240 may identify text that represents a broad category of entity and the classifier 242 may be used to identify data types within that broad category. For example, the decomposer 240 may identify text (i.e., content, a portion of the input file) an address and the classifier 242 may identify street numbers, street names, zip codes, cities, states, etc., within the address. As another example, the decomposer 240 may identify text as an identifier and the classifier 242 may determine which type of identifier. In some implementations, the classifier 242 may include a different classifier for each category. The classifier 242 may include one or more classifiers for a particular horizontal. For example, if text has been identified by the decomposer 240 as likely to be an address, the classifier 242 for addresses may identify Montgomery as a city rather than a person's last name based on gradient-based training. In some implementations, the classifier 242 may be a single classifier.

The classifier 242 may include a dictionary search. The dictionary may be a dictionary of common names (e.g., first names, surnames, business names, etc.). The dictionary (or dictionaries) can be for different languages. Thus, for example, if the decomposer 240 identifies text as likely a name, the classifier 242 may use a dictionary lookup to determine whether the text is, in fact, a name. Such dictionaries can be curated and may be specific to the nature of the input data 114. For example, medical dictionaries can be used to identify specific medication names, diseases, etc., for medical data. The classifier 242 may be configured to assign a confidence score to the classification of the content/text. Thus, for example, the classifier 242 may indicate that particular content is an address street name, but have a low confidence score (e.g., below 60%) or a high confidence score (e.g., 90%).

In some implementations, the decomposer 240 and the classifier 242 operate in an iterative fashion. For example, the decomposer 240 may identify content in a data portion of the input data 114 as likely being an address (high confidence score) and send the content to the classifier 242 to verify the content as an address and to further identify the different address portions within the content. If the classifier 242 is unable to classify all characters within the content as part of an address (e.g., some characters may be associated with a low confidence score), those characters may be sent back to the decomposer 240, and the decomposer 240 may re-categorize the characters. This iterative process, and the use of the classifier 242 enables de-identification at a granular level, e.g., the street address and zip code may be a protected data type but the city and state codes may not be protected data types. Likewise, the street address, zip code, and city may be protected data types, but the state code may not be. Using the decomposer 240 and classifier 242, even if structured data included the city, zip code, and/or state code in the same field (column) as the street address, the decomposer 240 and classifier 242 can break the content of the structured file down to the granular level desired for de-identification.

The decomposer 240 and classifier 242 may operate on data portions of the input data 114. The data portions can be dependent on the type of input. For example, a data portion may be a record, e.g., from a database, a JSON file, an XML file, etc. The data portion may be a row in a spreadsheet. The data portion may be a sentence in a document, a paragraph in a document, etc. A data portion may be a document in a file that contains multiple documents. For example, the input data 114 can be a file with multiple documents, each document being of the same type but for a different subject entity. In such an implementation, one document, relating to one subject entity, may be considered a data portion. The decomposer 240 and classifier 242 may identify content within the data portion that represents a protected data type. A data portion may include content representing multiple different protected data types.

In some implementations, the content representing a protected data type may be provided to the transformer 244. The transformer 244 may encode the content to generate encoded content (also referred to as transformed content or transformed text). The transformer 244 may use a seed 233 and a base set 235 to transform the content. The transformer 244 may select a seed 233 and/or a base set 235 based on the type of the protected data. For example, a first seed 233 may be used for names and a second seed 233 may be used for addresses. In some implementations, the first seed 233 and the second seed 233 may be generated from the same seed parameter 213 obtained from the requester. Likewise, a first base set 235 may be used for zip codes and a second base set 235 may be used for names.

Implementations of the transformer 244 can have various ways of using the seed 233 and the base set 235. A seed 233 is used to select a starting point within a base set. In a simple transformation (low randomness), each letter of the alphabet and each number and symbol are mapped to a different letter/number/symbol using the base set. In a highly simple example, the base set may be the alphabet and the seed may be the "shift" in the alphabet, e.g., a seed of 12 may mean that the letter A in the raw text is encoded as L in the encoded text (because L is the 12th letter of the English alphabet) and the letter B would be encoded a M, etc. This is an example of using every consecutive character after the starting point. However, implementations cover much more complex encoding techniques. For example, in some implementations, every nth character in the base set is used after the starting point (e.g., every 3rd, every 4th, etc.). In some implementations, the base set can be a number, such as pi ($\pi$) or Euler's number (e). and the seed 233 may represent a starting position within the number. If the text to be encoded is alphabetic, the seed may represent an index into an alphabet or character set. For example, if the base set is $\pi$ and the seed is 3, the first three values would be 4, 1, 5, with an A being encoded as the 4th character/letter of the character set/alphabet, a B being encoded as the first character/letter, a C being encoded as the 5th character/letter, etc. Thus, 4, 1, and 5 represent indices into a character set. The character set can be an ASCII character set or a portion of the ASCII character set. The character set can be any character set compatible with the input. The character set can be in a different language, or include characters from a different language than the language of the input data set. In some implementations, the seed may identify a number used as a shift for an alphabet or character set. For example, if the base set is $\pi$ and the seed is 3, the shift can be 4, with an A being encoded as an E, a B as F, etc. In some implementations, the shift may differ based on data type. In the previous example, a first protected data type may use a shift of 4, a second protected data type may use a shift of 1, a third protected data type may use a shift if 5, etc. This makes decoding harder because the same letters are encoded differently based on the data type. In a similar manner, a base set could be partitioned and each protected data type may use a different partition of the base set. Thus, for example, the number $\pi$ can be partitioned into 100 portions, with each different protected data type being assigned a different portion. If the seed is 3, this starting position may be used in each portion. In another implementation, one or more portions may use a different seed and thus a different starting position within the base set portion, Thus, implementations support complex encoding techniques that make it impossible to decode.

In some implementations the base set may be text, e.g., a text file provided by the requester/data set owner. In such an implementation, the seed may identify a starting position within the text file and alphabetic characters that appear in the text file are used to encode the protected data portion. In some implementations, the base set can be any digital file (audio file, video file, text file, biometric, etc.). In such an implementation, each byte may represent an index into a character set or alphabet, or the byte may represent the shift within an alphabet/character set, etc.

In some implementations, the transformer 244 may receive feedback, e.g., from the decision making layer 248. The feedback may cause the transformer 244 to change the seed and/or base set and/or partitioning of the base set. This change can be adding/subtracting an offset to the seed. This change can be changing to a different base set (e.g., one of the default base sets). If the fidelity parameter 217 is not met and the seed 233 and/or base set 235 is changed, the transformer 244 may re-encode the input data 114.

Once the transformer 244 has encoded the content that corresponds to the protected data types in the data portion of the input data 114, the encoded content is provided to the merger 250. The merger 250 is configured to generate the de-identified data portion that will be included in the de-identified output 131. If the output configuration is the same as the input configuration, the merger 250 can, for the content corresponding to each protected data type identified in the data portion, replace the content (the raw content, or the original content) with the corresponding encoded content generated by the transformer 244. This de-identified data portion is then added to the de-identified output 131. If the output configuration is different from the input configuration, the merger 250 may generate the de-identified data portion in accordance with the output configuration 219. Thus, for example, the merger 250 may extract data types identified in the output configuration 219 and generate a de-identified data portion that includes the extracted fields in the specified format/order. The de-identifying encoder 120 repeats these operations for each data portion in the input data 114. When all data portions have been processed by the model 125, the de-identified output 131 is complete and can be provided to the data requester.

Figure 2B:
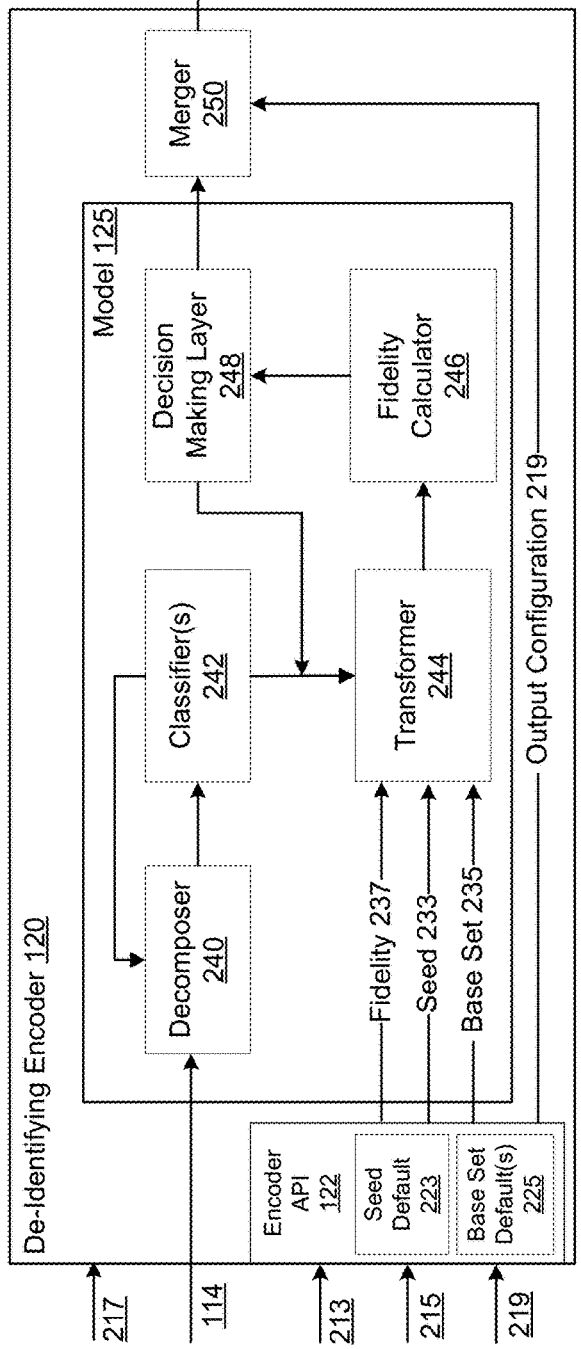
FIG. 2B describes a high level depiction of an example de-identifying encoder with a fidelity parameter, according to a disclosed implementation.

FIG. 2B describes a high level depiction of an example de-identifying encoder with a fidelity parameter, according to a disclosed implementation. The components of the de-identifying encoder 120 of FIG. 2B operate as described above with respect to FIG. 2A except as noted below. The de-identifying encoder 120 of FIG. 2B includes a fidelity calculator 246 and a decision making layer 248 and a fidelity parameter 217. The fidelity parameter 217 represents an indication of the desired randomness of the transformation. A user may provide a fidelity parameter 217, e.g., via the encoder API 122. This fidelity may be communicated to the transformer 244, e.g., as level of fidelity 237. The transformer 244 may be configured to select the best transformation to meet the level of fidelity 237. The level of fidelity 237 can be expressed as a percentage. The fidelity calculator 246 may be configured to compare the similarity and distance of the raw content and the encoded content and the decision making layer 248 may be configured to determine whether the similarity and distance meet the level of fidelity 237. If the similarity and distance does not meet (fails to meet) the level of fidelity 237, the decision making layer 248 may cause the transformer 244 to re-encode the input data 114 (e.g., regenerate the encoded content) using different parameters, e.g., using a different base set, using a different starting point within the base set. To use a different starting point in the base set the system may add a predetermined value to the seed 233, may request a different seed parameter 213 from the requestor, may select a different base set 235, or may use a different transformation of the seed parameter 213 to the seed 233.

FIG. 3 shows example protected data types and example transformed data, according to a disclosed implementation. In the example of FIG. 3, the input data (e.g., input data 114) includes personal content. The personal content includes nine protected data types 305 and one unprotected data type 310. In some implementations, the protected data types 305 are identified as part of the decomposer 240 and/or classifier 242. In some implementations, one or more of the protected data types 305 are selected as protected data types by the requester. In some implementations, the unprotected data type(s) 310 are selected as unprotected by the requester. In other words, in some implementations, a data type (like "address.state") may be a protected data type by default but a user (data requester) can override the default, making the data type an unprotected data type. In some implementations, any data type not identified as a protected data type is assumed to be unprotected. Implementations may only encode protected data types 305. Thus, in the example of FIG. 3 the raw text 314 for the "address.state" data type is unchanged and, if included in the de-identified output 131, would be included as untransformed text 332.

FIG. 3 illustrates an example of encoded data with low fidelity. In the example of FIG. 3, the transformed text 331, which represents a transformation (encoding) of the raw text 314, keeps the formatting of the raw text 314. Thus, for example, the data type of "phone" keeps both the number of characters the same (10) and keeps the characters numeric only. A medium fidelity may allow two or more numbers to stay the same when encoded (e.g., a 1 may stay a 1). A high fidelity transformation may allow more numbers to remain unchanged. Similarly, low fidelity transformation of the "address.street" data type may result in the street name being encoded with no characters remaining the same. The he street type (e.g., DR., CIR., RD., etc.) may remain unencoded, as illustrated in FIG. 3. This makes the transformed text 331 readable to a human while hiding the actual value of the raw text 314. Low fidelity may also allow similar characters from another language to be used for encoding, e.g., accented characters from Latin-based languages may be used even if the language of the input data 114 does not include accented characters. High fidelity may allow some characters to remain unchanged, e.g., changing "Bellview" to "Bemmspew."

Figure 4:
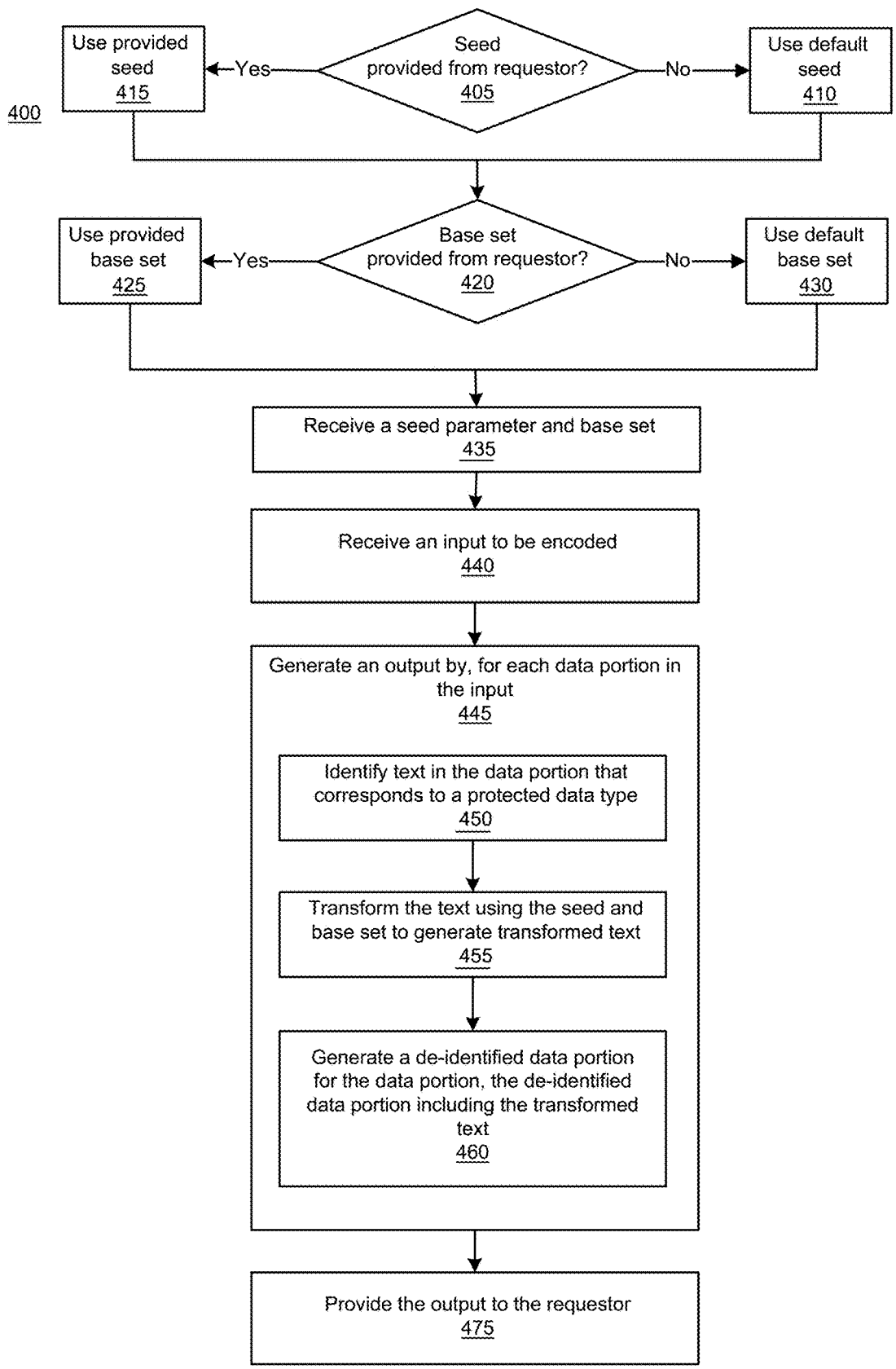
FIG. 4 illustrates a flowchart of an example process of encoding a data set, according to a disclosed implementation.

FIG. 4 illustrates a flowchart of an example process 400 of encoding a data set, according to a disclosed implementation. Process 400 may be performed by a data provider system, such as data provider system 110 of FIG. 1. Some or all of process 400 can be implemented by a de-identifying encoder, such as de-identifying encoder 120 of FIG. 1. Process 400 identifies content that represents a protected data type (e.g., of several protected data types), and encodes the content so that the content is de-identified. In other words, process 400 identifies content that should be encoded and performs the encoding. Process 400 is highly configurable. The encoding is based on a seed and a base set, both of which are configurable. This makes it difficult, if not impossible, to recover the encoded data. But the encoding can preserve the format of the raw (unencoded) content, so that analysis can take place without changes to existing processes.

Process 400 may begin with a determination of a seed for use in the transformation (405). If a seed is provided by the data requester (405, Yes), the provided seed will be used in the encoding (415). The seed provided by the requester may be a seed selected from seeds suggested by the system or provided (selected by) the requester, as disclosed herein. If a seed is not provided by the data requester (405, No), a default seed is used in the encoding (410). In some implementations, the system may have one default seed. In some implementations, the system may have a default seed for a particular field/content format. For example, the system may have a first default seed for alphabetic content, a second default seed for numeric content, and a third default seed for mixed (alpha-numeric) content, etc. In some implementations, the system may have a default seed for one or more protected data types. In other words, the system may select the default seed to be used in the transformation based on the data type. Thus, although illustrated as first steps for ease of description, selection of the seed may be part of generating the output (445), because the seed may change depending on the content being encoded.

The system may also determine a base set for use in the transformation (420). If a base set is provided by the data requester (420, Yes), the provided base set will be used in the encoding (425). If a base set is not provided by the data requester (420, No), a default base set is used in the encoding (430). As with the seed, the system may be configured to use one or more base sets in the transformation. In some implementations, the base set used may be dependent on the type of content being encoded or based on attributes of the content being encoded (e.g., alphabetic, alpha-numeric, etc.) Also as described herein, a base set (or sets) may be recommended after analysis of the input. In other words, the system may analyze the input to determine the appropriate base sets. Also as with the seed, steps 420-430 may be performed as part of generating the output (e.g., 445) where the base set is dependent on the content/data type. A requester may provide a seed without providing a base set. A requester may provide a base set without providing a seed.

The system receives a seed and a base set (435) and an input to be encoded (440). The input can be a file with structured data (e.g., records from a database, rows from a spreadsheet, records from a JSON or XML file, comma-delimited file, fixed-length file, etc.). The input can be an unstructured file (e.g., a document). The input may include a plurality of data portions. The data portion can be dependent on the type of input. For example, the plurality of data portions may be a plurality of records, e.g., from a database, JSON file, XML file, etc. The plurality of data portions may be a plurality of rows in a spreadsheet. The plurality of data portions may be a plurality of sentences in a document or a plurality of lines in a document. The plurality of data portions may be documents in the input file. For example, the input can be a file with multiple documents, each document being of the same type but for a different subject entity. In such an implementation, one document, relating to one subject entity, may be considered a data portion. In some implementations, the system may also receive an output configuration that differs from the input configuration (not illustrated in FIG. 4). The output configuration can thus be a JSON file or a comma-delimited file where in the input is an unstructured document or records from a database, as disclosed herein. The system may generate the output (445)

by encoding the data portions of the input. Generating the output for a data portion includes identifying text in the data portion that corresponds to a protected data type (450). The identification can be performed by a decomposer and/or a classifier, as disclosed herein. When content that represents a protected data type is identified, the system transforms the text of the content using the seed and the base set parameter (455). The transformation is described in more detail with regard to FIGS. 2A and 2B. The system may perform a transformation on content represented by each protected data type identified in the data portion. Thus, for example, in a database record with six fields, the system may identify three fields as representing protected data types and perform a transformation on each of the three fields so identified.

The system then generates a de-identified data portion (i.e., encoded data portion) for the output (460). Generating the de-identified portion is described in more detail with regard to the transformer 244 of FIGS. 2A and 2B. In some implementations, the system may replace the content with the de-identified data portion. In other words, the system may generate an updated portion (the de-identified data portion) by replacing the raw text with the transformed text. This de-identified portion is included in the output. In the example above (where three of six fields correspond to protected data types), the output will include three fields with transformed text and three fields with raw text. Similarly, if the portion is a sentence, the de-identified data portion is the sentences with any words corresponding to a protected data type replaced with the transformation of the words. In some implementations, the encoded (de-identified) data portion may have a different configuration than the data portion from the input. For example, a requester may specify an output configuration that differs from the input configuration. Thus, for example, the input configuration may be a document and the output configuration may be a row in a comma-delimited file or a record in a JSON file. In this scenario, one row or record may correspond to one document from the input file. The row/record may include raw (un-encoded) fields identified by the system in the document as well as transformed fields. Thus, the configuration of the de-identified data portion may depend on the configuration of the output. When all data portions in the input have been processed, the system provides the output to the requester (475). This may include storing the output to a specified location, sending the output to a specified address, and/or otherwise providing the requester with access to the output. Process 400 then ends.

[A working example in the healthcare industry is now described. This example is provided to aid in the understanding of this disclosure and implementations are not limited to the specific scenario described, as the methods and techniques can be adapted to other types of reporting environments. Implementations thus include adaptations of the underlying technology and techniques to other industries.

Healthcare data is one example of sensitive data that is subject to regulations. For example, United States federal law (HIPPA) requires that data identifying a person and that person's health history be securely stored and not shared. However, advances in medical treatments, medications, and diagnostics can be greatly helped by analyzing the healthcare data of a large group of people, especially those enrolled in clinical studies. This healthcare information can reside with a number of different institutions, e.g., pharmacies, health insurance, hospitals, physician offices, etc. These institutions may be unwilling to share or unable to share their data, but may be willing to do so if the identities of the patients cannot be determined. Implementations make this sharing among a large group of data set owners possible because each institution, using the encoding techniques disclosed (e.g., using de-identifying encoder 120), can encode their data in a format that makes the encoded data unable to be traced back to a patient. Thus, for example, a researcher may request that data set owner A and data set owner B encode their respective data sets and provide the encoded data to the researcher. Data set owner A and dataset owner B may collaboratively choose the same parameters (e.g., same seed, same base set, same fidelity), thus ensuring that the data is encoded in the same manner. If the researcher desires only certain data fields from each data set, the researcher can request the certain fields from data set owner A and/or data set owner B. Thus, the de-identified output 131 from data set owner A and data set owner B may be different (include different fields) but where the two outputs share a protected data field it will be similarly encoded. This enables the researcher to join the output where needed for analysis, e.g., to identify trends, etc. But the researcher lacks the ability to decode the data, making the underlying protected data secure. In some implementations, the seed parameter is not stored or known by the data set owners, so the data set owners also could not decode the encoded data elements, further protecting data from multiple sources. This is one example of how implementations enable data set owners (the requesters) to securely share data at will without losing interoperability.

Although discussed above in the context of a human researcher requesting data, implementations also cover scenarios where the request is automated. In other words, the encoder API may be configured to communicate programmatically with other applications/processes. Thus, for example, a data set owner can configure the encoder API to respond to requests from another application.

As used herein, a computer processor can refer to one or more computer processors in one or more apparatuses or any combinations of one or more computer processors and/or apparatuses. The computer processors represent hardware processors, e.g., formed in a substrate. An aspect of an embodiment relates to causing and/or configuring one or more apparatuses and/or computer processors to execute the described operations. The results produced can be output to an output device, for example, displayed on the display. The results produced can be provided to a remote memory, e.g., for remote analysis. An apparatus or device refers to a physical machine that performs operations, for example, a computer (physical computing hardware or machinery) that implement or execute instructions, for example, execute instructions by way of software, which is code executed by computing hardware including a programmable chip (chipset, computer processor, electronic component), and/or implement instructions by way of computing hardware (e.g., in circuitry, electronic components in integrated circuits, etc.)— collectively referred to as computer processor(s), to achieve the functions or operations being described. The functions of embodiments described can be implemented in any type of apparatus that can execute instructions or code.

More particularly, programming or configuring or causing an apparatus or device, for example, a computer, to execute the described functions of embodiments creates a new machine. In other words, a general purpose computer in effect becomes a special purpose computer once it is programmed or configured or caused to perform particular functions of the disclosed implementations pursuant to instructions from program software. According to an aspect of an embodiment, configuring an apparatus, device, computer processor, refers to such apparatus, device or computer processor programmed or controlled by software to execute the described functions.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blu-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware.

The many features and advantages of the disclosed implementations are apparent from the detailed specification and, thus, it is intended by the appended claims to cover all such features and advantages of the embodiments that fall within the true spirit and scope thereof. Further, it is not desired to limit the inventive embodiments to the exact construction and operation illustrated and described, and all suitable modifications and equivalents may be resorted to, falling within the scope thereof. For example, steps of disclosed methods/operations can be rearranged and some steps may be optional for some implementations. Various modifications may be made therein and the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. For example, although the implementation of various components described above may be embodied in a hardware device, it can also be implemented as a software only solution—e.g., an installation on an existing server. In addition, the de-identifying encoder and its components as disclosed herein can be implemented as a firmware, firmware/software combination, firmware/hardware combination, or a hardware/firmware/software combination.

Clause 1. A method comprising: receiving a request to encode an input that includes a plurality of data portions; and for each data portion in the plurality of data portions, generate an encoded data portion in an output by: identifying raw text in the data portion that corresponds to a protected data type, the raw text having a format, transforming the raw text using a seed and a base set to generate transformed text, the transformed text having a same format as the format of the raw text, and generate the encoded data portion corresponding to the data portion, the encoded data portion including the transformed text; and providing the output to a requester of the request.

Clause 2. The method of clause 1, wherein a particular data portion of the plurality of data portions represents unstructured text and identifying the raw text in the particular data portion that corresponds to a protected data type includes: providing the particular data portion to a decomposer configured to associate text in a data portion with a top-level class; and providing the raw text to a classifier configured to determine, for the top-level class, whether the raw text includes a protected data type.

Clause 3. The method of clause 2, wherein the raw text is first text and the protected data type is a first protected data type and the top-level class is a first top-level class and the particular data portion includes second text and the classifier is further configured to provide a confidence score, and the method further includes: determining that classifier provides a low confidence score for the second text and high confidence score for first text; and responsive to determining that the second text has a low confidence: providing the second text to the decomposer, the decomposer associating the second text with a second top-level class; and providing the second text to a classifier configured to determine, for the second top-level class, whether the second text includes a protected data type.

Clause 4. The method of any of clause 1 to clause 3, further comprising: obtaining an output configuration from the requester, the output configuration differing from a configuration of the input, wherein generating the encoded data portion includes formatting the encoded data portion in accordance with the output configuration.

Clause 5. The method of any of clause 1 to clause 4, wherein identifying the raw text that corresponds to the protected data type includes applying a pattern matcher to identify text matching a pattern.

Clause 6. The method of any of clause 1 to clause 5, wherein identifying the raw text that corresponds to the protected data type includes: identifying the raw text as occurring at a frequency in the data portion that exceeds an expected frequency threshold.

Clause 7. The method of any of clause 1 to clause 6, further comprising: receiving an indication of the base set from the requester.

Clause 8. The method of clause 7, wherein receiving the indication of the base set from the requester includes receiving a selection of a base set from a plurality of suggested base sets.

Clause 9. The method of any of clause 1 to clause 6, wherein the base set is one of a plurality of base sets and is selected from among the plurality of base sets based on the protected data type.

Clause 10. The method of any of clause 1 to clause 9, further comprising: receiving a seed parameter from the requester, the seed being based on the seed parameter.

Clause 11. The method of clause 10, wherein the seed parameter is a biometric obtained from the requester.

Clause 12. The method of any of clause 1 to clause 11, further comprising: receiving a seed parameter and an indication of the base set from the requester, the seed being based on the seed parameter.

Clause 13. The method of any of clause 1 to clause 12, wherein transforming the raw text using the seed and the base set comprises using the seed to determine a starting position in the base set.

Clause 14. The method of clause 13, wherein the base set is a numeric base set and transforming the raw text using the seed and the base set further comprises: using the starting position to determine positions within the base set to use as indices into a character set.

Clause 15. The method of any of clause 1 to clause 14, wherein transforming the raw text includes determining whether the encoded data portion meets a fidelity parameter and in response to determining the encoded data portion fails to meet the fidelity parameter, changing the seed or the base set.

Clause 16. The method of any of clause 1 to clause 15, wherein the format represents a number of characters of a character type.

Clause 17. The method of any of clause 1 to clause 15, wherein the format represents a pattern of character types.

Clause 18. The method of any of clause 1 to clause 17, wherein the protected data type is one of a plurality of protected data types selected by the requester.

Clause 19. The method of any of clause 1 to clause 18, wherein transforming the raw text includes partitioning the base set into at least a first partition and a second partition, a first protected data type being transformed using the first partition and a second protected data type being transformed using the second partition.

Clause 20. A method comprising: receiving a seed parameter from a requestor; generating a first seed and a second seed from the seed parameter; identifying first raw text representing a first protected data type in an input; identifying second raw text representing a second protected data type in the input; generating first encoded text by transforming the first raw text using the first seed and a base set; generating second encoded text by transforming the second raw text using the second seed and the base set; and generating an output using the first encoded text and the second encoded text.

Clause 21. The method of clause 20, wherein the base set is a first base set and generating the second encoded text includes transforming the second raw text using the second seed and a second base set.

Clause 22. The method of clause 21, wherein the first base set is determined by the first protected data type and the second base set is determined by the second protected data type.

Clause 23. The method of any of clause 20 to clause 22, wherein the first raw text is transformed using the first seed and a first portion of the base set; and the second raw text is transformed using the first seed and second portion of the base set.

Clause 24. The method of any of clause 20 to clause 23, wherein transforming the first raw text includes determining whether the first encoded text meets a fidelity parameter and in response to determining the first encoded text fails to meet the fidelity parameter, the method further includes changing the first seed or the base set and regenerating the first encoded text.

Clause 25. A method comprising: generating a seed from a seed parameter obtained from a requestor; identifying first raw text representing a protected data type in an input; identifying second raw text representing a protected data type in the input; generating first encoded text by transforming the first raw text using the seed and a first portion of a base set; generating second encoded text by transforming the second raw text using the seed and a second portion of the base set; and generating an output using the first encoded text and the second encoded text.

Clause 26. A system comprising: at least one processor; and memory storing instructions that, when executed by the at least one processor, cause the system to perform the method of any of clause 1 to clause 25.

Clause 27: A non-transitory computer-readable medium storing instructions that, when executed by at least one processor, cause a computing device to perform the method of any of clause 1 to clause 25.

Clause 28: A system comprising: a means for identifying text representing protected data types in an input; a means for encoding the text representing protected data types based on a seed and a configurable base set; and a means for generating an output based on the input and the encoded text.

Clause 29. The system of clause 28, wherein the means for identifying text representing protected data types includes a decomposer configured to associate text in a data portion with a top-level class and a classifier configured to determine, for the top-level class, whether the raw text includes a protected data type.

Clause 30. The system of clause 29, wherein the classifier is further configured to send a portion of text back to the decomposer in response to the portion of text having a low confidence; and the decomposer is configured to reclassify the portion of text.

Clause 31. The system of any of clause 28 to clause 30, further comprising a means for obtaining an output configuration from the requester, the output configuration differing from a configuration of the input, wherein the means for generating the output is configured to format the encoded data portion in accordance with the output configuration.

Clause 32. The system of any of clause 28 to clause 31, wherein the means for identifying text representing protected data types includes a means for determining whether text matches a pattern.

Clause 33. The system of any of clause 28 to clause 32, the means for identifying text representing protected data types includes a means for identifying text occurring at a frequency in the input that exceeds an expected frequency threshold.

Clause 34. The system of any of clause 28 to clause 33, further comprising a means for receiving an indication of the base set from a requester.

Clause 35. The system of any of clause 28 to clause 33, wherein the base set is one of a plurality of base sets and the system includes a means for selecting from among the plurality of base sets based on the protected data type.

Clause 36. The system of any of clause 28 to clause 35, further comprising a means for receiving a seed parameter from a requester, the seed being based on the seed parameter.

Clause 37. The system of any of clause 28 to clause 35, further comprising a means for receiving a seed parameter and an indication of the base set from the requester, the seed being based on the seed parameter.

Clause 37. The system of clause 36 or clause 37, wherein the seed parameter is a biometric obtained from the requester.

Clause 38. The system of any of clause 28 to clause 37, wherein the means for encoding the text representing protected data types based on the seed and the configurable base set is configured to use the seed to determine a starting position in the base set.

Clause 39. The system of clause 38, wherein the base set is a numeric base set and the means for encoding the text representing protected data types based on the seed and the configurable base set is further configured to use the starting position to determine positions within the base set to use as indices into a character set.

Clause 40. The system of any of clause 28 to clause 39, wherein the means for encoding the text representing protected data types based on the seed and the configurable base set is configured to determine whether the encoded data portion meets a fidelity parameter and in response to determining the encoded data portion fails to meet the fidelity parameter, change the seed or the base set.

Clause 41. The system of any of clause 28 to clause 40, wherein the format represents a number of characters of a character type or pattern of character types.

Clause 42. The system of any of clause 28 to clause 41, wherein the protected data types include a protected data type selected by the requester.

Clause 43. The system of any of clause 28 to clause 42, wherein the means for encoding the text representing protected data types based on the seed and the configurable base set is configured to partition the base set into at least a first partition and a second partition, a first protected data type being transformed using the first partition and a second protected data type being transformed using the second partition.

What is claimed is:

1. A method comprising:
   receiving a request to encode an input that includes a plurality of data portions;
   for each data portion in the plurality of data portions, generating an encoded data portion in an output by:
      identifying raw text in the data portion that corresponds to a protected data type, the raw text having a format, wherein a particular data portion of the plurality of data portions represents unstructured first text and unstructured second text and identifying the raw text in the particular data portion that corresponds to a protected data type includes:
         providing the particular data portion to a decomposer configured to associate text in a data portion with a first top-level class,
         providing the raw text to a classifier configured to determine, for the first top-level class, whether the raw text includes a protected data type,
         determining that classifier provides a low confidence score for the unstructured second text and a high confidence score for the unstructured first text, and
         responsive to determining that the unstructured second text has a low confidence:
            providing the unstructured second text to the decomposer, the decomposer associating the unstructured second text with a second top-level class, and
            providing the unstructured second text to a classifier configured to determine, for the second top-level class, whether the unstructured second text includes a protected data type,
      transforming the raw text using a seed and a base set to generate transformed text, the transformed text having a same format as the format of the raw text, and
      generating the encoded data portion corresponding to the data portion, the encoded data portion including the transformed text; and
   providing the output to a requester of the request.

2. The method of claim 1, further comprising:
   obtaining an output configuration from the requester, the output configuration differing from a configuration of the input,
   wherein generating the encoded data portion includes formatting the encoded data portion in accordance with the output configuration.

3. The method of claim 1, wherein identifying the raw text that corresponds to the protected data type includes:
   identifying the raw text as occurring at a frequency in the data portion that exceeds an expected frequency threshold.

4. The method of claim 1, further comprising:
   receiving an indication of the base set from the requester.

5. The method of claim 4, wherein receiving the indication of the base set from the requester includes receiving a selection of a base set from a plurality of suggested base sets.

6. The method of claim 1, wherein the base set is one of a plurality of base sets and is selected from among the plurality of base sets based on the protected data type.

7. The method of claim 1, further comprising:
   receiving a seed parameter from the requester, the seed being based on the seed parameter.

8. The method of claim 7, wherein the seed parameter is a biometric obtained from the requester.

9. The method of claim 1, further comprising:
   receiving a seed parameter and an indication of the base set from the requester, the seed being based on the seed parameter.

10. The method of claim 1, wherein transforming the raw text using the seed and the base set comprises using the seed to determine a starting position in the base set.

11. The method of claim 10, wherein the base set is a numeric base set and transforming the raw text using the seed and the base set further comprises:
    using the starting position to determine positions within the base set to use as indices into a character set.

12. The method of claim 1, wherein transforming the raw text includes determining whether the encoded data portion meets a fidelity parameter and in response to determining the encoded data portion fails to meet the fidelity parameter, changing the seed or the base set.

13. The method of claim 1, wherein transforming the raw text includes partitioning the base set into at least a first partition and a second partition, a first protected data type being transformed using the first partition and a second protected data type being transformed using the second partition.

14. A system comprising:
    at least one processor;
    a decomposer configured to associate text in a data portion with a top-level class;
    memory storing instructions that, when executed by the at least one processor, performs operations including:
       receiving a request to encode an input that includes a plurality of data portions;
       for each data portion in the plurality of data portions, generating an encoded data portion in an output by:
          identifying raw text in the data portion that corresponds to a protected data type, the raw text having a format, wherein a particular data portion of the plurality of data portions represents unstructured first text and unstructured second text and identifying the raw text in the particular data portion that corresponds to a protected data type includes:
             providing the particular data portion to the decomposer, the decomposer associating the unstructured first text and the unstructured second text with a first top-level class,
             providing the unstructured first text and the unstructured second text to a classifier, the classifier configured to determine, for the first top-level class, whether the text in a data portion includes a protected data type;
             determining that the classifier provides a low confidence score for the unstructured second text and a high confidence score for the unstructured first text, and
             responsive to determining that the unstructured second text has a low confidence:
                providing the unstructured second text to the decomposer, the decomposer associating the unstructured second text with a second top-level class, and
                providing the unstructured second text to a classifier configured to determine, for the second top-level class, whether the unstructured second text includes a protected data type, transforming the raw text using a seed and a base set to generate transformed text, the transformed text having a same format as the format of the raw text, and generating the encoded data portion corresponding to the data portion, the encoded data portion including the transformed text; and providing the output to a requester of the request.

15. The system of claim 14, the operations further comprising:

obtaining an output configuration from the requester, the output configuration differing from a configuration of the input, wherein generating the encoded data portion includes formatting the encoded data portion in accordance with the output configuration.

16. The system of claim 14, the operations further comprising:

receiving an indication of the base set from the requester.

17. The system of claim 14, wherein the base set is one of a plurality of base sets and is selected from among the plurality of base sets based on the protected data type.

18. The system of claim 14, the operations further comprising:

receiving a seed parameter from the requester, the seed being based on the seed parameter.

19. The system of claim 14, wherein the base set is a numeric base set and transforming the raw text using the seed and the base set comprises using the seed to determine a starting position in the base set and using the starting position to determine positions within the base set to use as indices into a character set.

20. The system of claim 14, wherein transforming the raw text includes determining whether the encoded data portion meets a fidelity parameter and in response to determining the encoded data portion fails to meet the fidelity parameter, changing the seed or the base set.

21. The system of claim 14, wherein transforming the raw text includes partitioning the base set into at least a first partition and a second partition, a first protected data type being transformed using the first partition and a second protected data type being transformed using the second partition.

* * * * *